(12) United States Patent  (10) Patent No.: US 6,759,822 B2
Marusarz  (45) Date of Patent: Jul. 6, 2004

(54) METHODS AND APPARATUS TO IMPROVE THE PERFORMANCE OF UNIVERSAL ELECTRIC MOTORS

(75) Inventor: Ronald K. Marusarz, Carbondale, IL (US)

(73) Assignee: Southern Illinois University, Carbondale, IL (US)

( * ) Notice: Subject to any disclaimer, the term of this patent is extended or adjusted under 35 U.S.C. 154(b) by 0 days.

(21) Appl. No.: 10/323,851

(22) Filed: Dec. 18, 2002

(65) Prior Publication Data

US 2003/0128003 A1 Jul. 10, 2003

Related U.S. Application Data

(60) Provisional application No. 60/343,070, filed on Dec. 20, 2001.

(51) Int. Cl.[7] .................................................. H02P 5/00
(52) U.S. Cl. ........................ 318/268; 318/599; 318/603
(58) Field of Search ............................... 318/268, 599, 318/603, 608, 432, 434, 759, 802, 362, 701, 821, 244

(56) References Cited

U.S. PATENT DOCUMENTS

| | | | |
|---|---|---|---|
| 4,985,118 A | 1/1991 | Kurematsu et al. ......... | 159/47.3 |
| 5,294,874 A | 3/1994 | Hessenberger et al. ..... | 318/759 |
| 5,304,885 A | 4/1994 | Wong et al. ................ | 310/216 |
| 5,440,219 A | 8/1995 | Wilkerson .................. | 318/802 |
| 5,444,318 A | 8/1995 | Stumpf ....................... | 310/77 |
| 5,449,963 A | 9/1995 | Mok .......................... | 310/270 |
| 5,507,054 A | 4/1996 | Blauert et al. ................ | 8/159 |
| 5,511,715 A | 4/1996 | Crutcher et al. ............. | 227/131 |
| 5,525,774 A | 6/1996 | Dolgas et al. ................ | 219/89 |
| 5,530,325 A | 6/1996 | Friedrich et al. ............ | 318/245 |
| 5,533,805 A | 7/1996 | Mandel ...................... | 366/285 |
| 5,538,194 A | 7/1996 | Stangenberg et al. ....... | 241/100 |
| 5,552,686 A | 9/1996 | Schmid et al. .............. | 318/362 |
| 5,596,236 A | 1/1997 | Lee et al. ...................... | 310/68 |
| 5,648,706 A | 7/1997 | Polk et al. .................. | 318/376 |
| 5,653,536 A | 8/1997 | Mandel ...................... | 366/285 |
| 5,667,141 A | 9/1997 | Suttner ....................... | 239/332 |
| 5,672,922 A | 9/1997 | Raichle et al. ................ | 310/68 |
| 5,677,586 A | 10/1997 | Horst ......................... | 310/103 |
| 5,736,828 A | 4/1998 | Turner et al. ............... | 318/701 |
| 5,753,993 A | 5/1998 | Steidle et al. ............... | 310/239 |
| 5,757,162 A | 5/1998 | Weber ........................ | 318/821 |
| 5,760,553 A | 6/1998 | Astic et al. .................. | 318/244 |
| 5,765,582 A | 6/1998 | Molnar, IV .................. | 135/16 |
| 5,780,990 A | 7/1998 | Weber ........................ | 318/807 |
| 5,806,169 A | 9/1998 | Trago et al. ................... | 29/596 |
| 5,811,945 A | 9/1998 | Hellinger et al. ........... | 318/246 |
| 5,856,731 A | 1/1999 | Rottmerhusen ............. | 318/245 |

(List continued on next page.)

*Primary Examiner*—Karen Masih
(74) *Attorney, Agent, or Firm*—Fulbright & Jaworski, LLP

(57) ABSTRACT

Systems and methods are described for improving the performance of electric motors which employ commutators and brushes. A method includes improving the performance of an electric motor that employs a commutator and brushes comprising: sending power to the motor, reading a set of data from the motor using an analog to digital converter and a microcontroller configured to execute digital signal processing software, setting a speed for the motor, and maintaining the speed for the motor based on the set of data as analyzed by the microcontroller. An apparatus includes a current sensing device coupled in series to the motor to monitor the current of the motor, a solid state switch coupled through the microcontroller to the current sensing device which controls the amount of current delivered to the motor, a high pass filter coupled to the current sensing device that removes the 60 Hz frequency component from the voltage of the current sensing device, an analog to digital converter that sends digital output to the microcontroller, and a microcontroller to perform digital signal processing coupled to the solid state switch.

30 Claims, 3 Drawing Sheets

U.S. PATENT DOCUMENTS

| | | | |
|---|---|---|---|
| 5,889,922 A | 3/1999 | Bufe et al. | 388/804 |
| 5,896,017 A | 4/1999 | Severson et al. | 312/280 |
| 5,902,386 A | 5/1999 | Gustafson et al. | 96/333 |
| 5,944,376 A | 8/1999 | Buchanan, Jr. | 296/146.4 |
| 5,952,754 A | 9/1999 | Mok | 310/91 |
| 5,957,021 A | 9/1999 | Meredith et al. | 83/397 |
| 5,959,387 A | 9/1999 | Mowery et al. | 310/198 |
| 5,960,531 A | 10/1999 | Mora et al. | 29/560 |
| 5,967,205 A | 10/1999 | Welsh et al. | 144/117.1 |
| 5,986,417 A | 11/1999 | Nicolai et al. | 318/245 |
| 6,013,964 A | 1/2000 | Meyer | 310/184 |
| 6,014,598 A | 1/2000 | Duyar et al. | 701/29 |
| 6,016,041 A | 1/2000 | Weinmann | 318/245 |
| 6,020,661 A | 2/2000 | Trago et al. | 310/43 |
| 6,076,573 A | 6/2000 | Welsh et al. | 144/117.1 |
| 6,097,128 A | 8/2000 | Ko | 310/239 |
| 6,107,762 A | 8/2000 | Schauer | 318/245 |
| 6,114,792 A | 9/2000 | Tiemeyer | 310/233 |
| 6,137,194 A | 10/2000 | Haugseth | 310/1 |
| 6,169,351 B1 | 1/2001 | Bohart et al. | 310/239 |
| 6,179,105 B1 | 1/2001 | Haass | 191/22 |
| 6,246,197 B1 * | 6/2001 | Kurishige et al. | 318/432 |
| 6,326,757 B1 * | 12/2001 | Aoki et al. | 318/599 |

* cited by examiner

METHODS AND APPARATUS TO IMPROVE THE PERFORMANCE OF UNIVERSAL ELECTRIC MOTORS

This application claims priority to, and incorporates by reference, U.S. Provisional Patent Application Serial No. 60/343,070 by Ronald K. Marusarz entitled "Device to Improve the Performance of Universal Electric Motors," which was filed Dec. 20, 2001.

BACKGROUND OF THE INVENTION

1. Field of the Invention

The invention relates generally to the field of electric motors. More particularly, the invention relates to electric motors which employ commutators and brushes. Even more particularly, the invention relates to techniques for controlling and maintaining the speed of electric motors that employ commutators and brushes.

2. Discussion of the Related Art

Electric motors have been the major source of power for many different types of equipment since their early days. The power source can be either AC or DC. AC and DC performance differ in that the DC power source has both higher efficiency and output.

An electromagnet is the basis of an electric motor. The armature in the motor is an electromagnet made by coiling thin wire around two or more poles of a metal core. The armature has an axle, and the commutator is attached to the axle. The commutator is typically a pair of plates, which provide the two connections for the coil of the electromagnet, attached to the axle.

The ongoing reversing of the electric field by the motor is what makes it run and is accomplished by two parts: the commutator and the brushes. The contacts of the commutator are attached to the axle of the electromagnet, so they spin with the magnet. The brushes are usually just two pieces of metal or carbon that make contact with the contacts of the commutator.

In applications using electric motors, it is often necessary to control the speed of the motors in the equipment in which they are installed. The speed may be required to be fairly constant, regardless of the load amounts placed upon the motor. In industrial applications, extremely accurate measurement of the speed is sometimes a necessity.

One conventional method of motor speed control is to use open loop control. In this method, the power input to the motor is controlled, but no feedback is allowed from the motor itself. The problem with this technology is that it causes the motor input power to stay constant, regardless of the load on the motor. Therefore, for cases of varying motor loads, it is possible for the motor speed to vary with varying motor loads. The controller has no way of detecting speed variations.

Another conventional method incorporates a feedback loop into the control mechanism. This approach usually uses a mechanical sensor, such as an optical disk or magnet, coupled to an optical or magnetic sensor, to measure the rotational speed of the motor. The problem with this approach is that the sensors are expensive and it requires a detailed installation of the sensors and related equipment. This results in a complicated machine to install and use.

There have been various designs that tried to overcome the limitations of the above mentioned methods. However, these have been limited in their implementation. Some are only suitable for motors featured in small household appliances, such as U.S. Pat. No. 4,673,860, which is incorporated herein by reference, while others are only useable for universal motors powered by AC currents, such as U.S. Pat. No. 5,986,417, which is incorporated herein by reference, and yet others are used with induction motors, which do not possess brushes.

Heretofore, the requirements of a simple motor speed control apparatus that is easy to install and use, which keeps the speed constant even under varying loads for an electric motor powered by an AC or DC power supply, and which utilizes a commutator and brushes have not been fully met. What is needed is a solution that simultaneously addresses all of these requirements.

SUMMARY OF THE INVENTION

Embodiments of the present disclosure address several, if not all, of the requirements mentioned above. The following embodiments are representative. Of course, the invention is not limited to these embodiments.

According to an aspect of the invention, a method comprises: improving the performance of an electric motor that employs a commutator and brushes including: sending power to the motor, reading a set of data from the motor using an analog to digital converter and/or digital I/O port and a microcontroller configured to execute digital signal processing software, setting a speed for the motor, and maintaining the speed for the motor based on the set of data as analyzed by the microcontroller. The motor armature current waveform contains spikes that occur every time the brushes pass over a gap in the commutator. The digital signal processing separates these commutator spikes from the other noise present in the current waveform. By digitally measuring the frequency or time between these spikes, an accurate indication of the motor's speed is obtained. By sensing the time of spike occurrence and predicting the occurrence time of the next spike, the invention can utilize a solid state switch to momentarily interrupt the current to the motor, there by eliminating or reducing arcing between the commutator and the brushes. According to another aspect of the invention, an apparatus comprises: a current sensing device coupled in series to the motor to monitor the current of the motor, a solid state switch coupled to the microcontroller which controls the amount of current delivered to the motor, a high pass filter coupled to the current sensing device that removes the 60 Hz frequency component from the voltage of the current sensing device, an analog to digital converter and/or digital I/O port that sends digital output to the microcontroller, and a microcontroller to perform digital signal processing coupled to the solid state switch.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. As will be recognized by those having ordinary skill in this art, many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same or similar elements. The invention may be better understood by reference to one or more of these drawings in combination with the description presented herein. It should be noted that the features illustrated in the drawings are not necessarily drawn to scale.

DESCRIPTION OF EXEMPLARY EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating specific embodiments of the invention, are given by way of illustration only and not by way of limitation.

The context of the invention can include a speed control for an electric motor possessing a commutator and brushes.

This motor speed control device senses the speed of an electric motor by means of digital signal processing the armature current waveform. The device is applicable to AC and DC motors possessing a commutator and brushes. The motor armature current waveform contains spikes or fast rise-time transient pulses that occur every time the brushes pass over a gap in the commutator.

The digital signal processing separates these commutator spikes from the other noise present in the current waveform. By digitally measuring the frequency or time between these spikes, an accurate indication of the motor's rotational speed and/or rotor position data is obtained. A constant motor speed may be maintained by comparing the measured speed to the desired speed and increasing or decreasing the motor's current by altering either the voltage or duty cycle, or both, as needed to maintain a constant speed even when the load conditions upon the motor varies.

Figure 1:
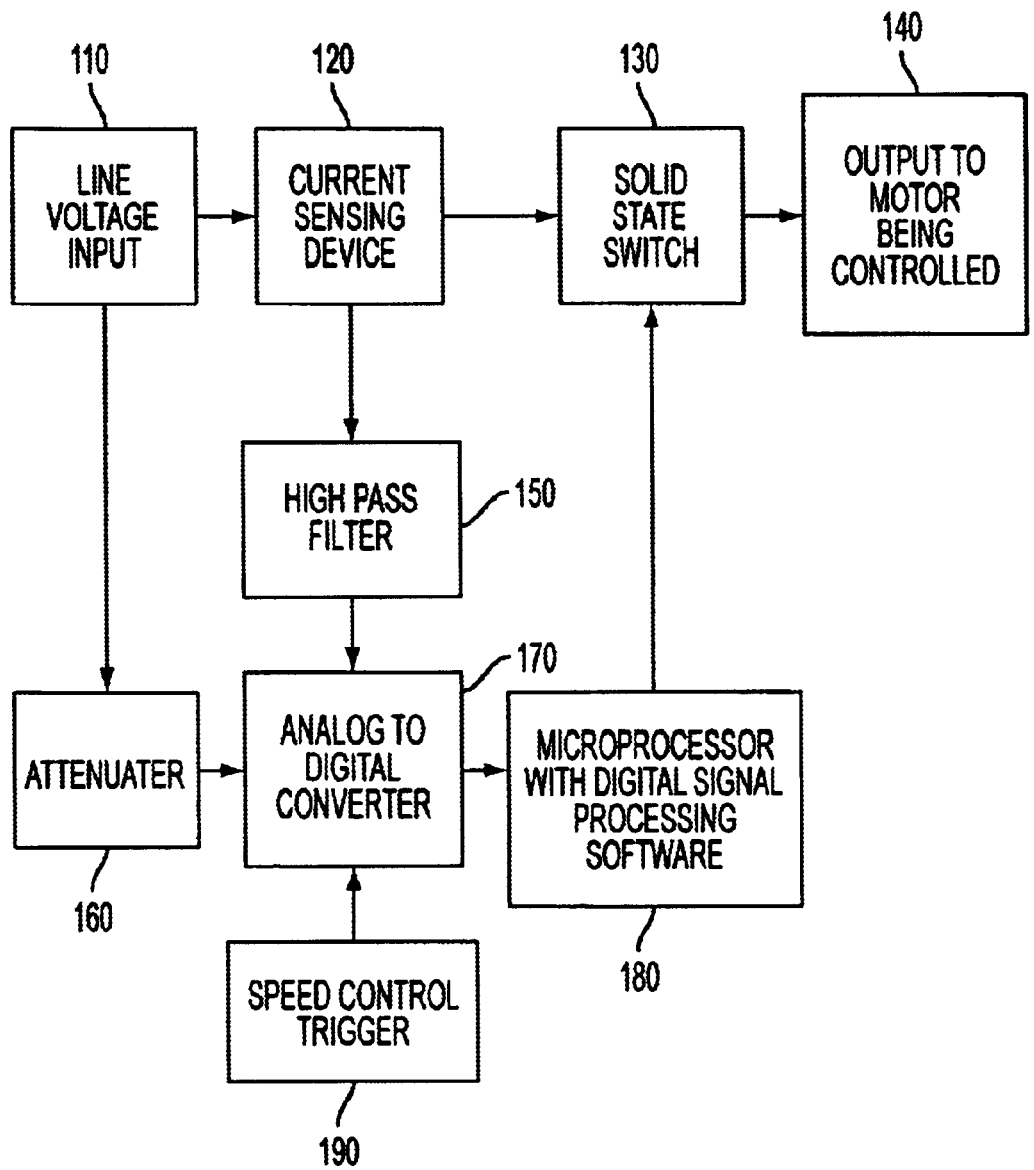
FIG. 1 illustrates a block diagram of an embodiment of the invention.

A block diagram of one embodiment of a motor control system is shown in FIG. 1. A line voltage input 110 is the control device's connection to the power source of the motor. Typically, the power source may be 110 VAC at 60 Hz for a line voltage operated motor or 12 VDC for a cordless type power tool. On its way to the motor, the current passes through a current sensing device 120. The current sensing device 120 may be a resistor or coil that develops a voltage across it due to the current moving through the motor.

After passing through the resistor 120, the current continues on through a solid state switch 130, eventually reaching the motor, as output to the motor 140. The solid state switch 130 controls the amount of current delivered to the motor 140. The solid state switch 130 is driven by the output signal from a microcontroller 180 containing digital signal processing software.

The voltage output (typically a few volts) from the current sensing device 120 is passed through a high pass filter 150. The filter 150 removes the 60 Hz frequency component from the voltage output and enhances the high frequency voltage spikes produced by the motor's brushes passing over the gaps in the motor's commutator. The output signal from the high pass filter 150 is fed into one of the three input channels of an analog to digital converter 170. In some applications, the output signal from the high pass filter is amplified and fed directly into a digital I/O port the microcontroller by passing the A/D converter. The binary digital output of the analog to digital converter 170 is read into the microcontroller 180 that extracts the necessary rotational speed and/or rotor position information from it.

For AC motor control, a sample of the line voltage 110 is reduced to a few volts by an attenuator 160 and then fed into the second input channel of the analog to digital converter 170 and/or digital I/O port. The binary digital output of the analog to digital converter 170 is read into the microcontroller 180 which extracts the zero crossing information from the AC sinewave. For proper phase control, this information is needed to compute when to trigger the solid state switch 130.

The speed control trigger 190 may be a potentiometer that the user controls to select the desired motor speed. The potentiometer produces an output voltage that is then fed into the third input channel of the analog to digital converter 170. The binary digital output of the analog to digital converter 170 is read into the microcontroller 180 that extracts the desired speed information.

The microcontroller software may work in the following fashion. Given the desired speed information, for example, a speed control trigger setting of one half of maximum speed, the microcontroller drives the solid state switch with a duty cycle of 50%, which delivers half of full power to the motor. After a time of approximately one-second, which allows the motor to come up to speed, the microcontroller measures the frequency of the voltage spikes coming from the current sensor.

This frequency is an indication of the motor's speed. As the motor is loaded down, its speed will start to decrease. Any decrease in speed will cause a reduction in the frequency of the voltage spikes coming from the current sensor. The microcontroller will detect this decrease in frequency and will increase the duty cycle of the solid state switch to deliver more power to the motor, thus maintaining constant motor speed even as the load varies. This acceleration and deceleration of the motor speed is uniform and controlled.

The uniform acceleration and deceleration automatically prevents overly fast speed changes. This is a safety feature that is important when the load is suddenly removed. It also gives the trigger mechanism a better feel of control, because the motor would accelerate and decelerate at a smooth, slow rate, as discussed earlier. Also, this function prevents the motor from racing to full speed when the trigger is first pressed, which reduces the chances of placing undue work load on the motor that would increase the wear and tear of the equipment operated by the motor.

Whenever the speed control trigger setting is changed, the microcontroller will repeat the above process. As long as the speed control trigger setting is held constant, the microcontroller will maintain a constant frequency from the current sensor and therefore, a constant motor speed. It may also have an anti-stall feature that operates even when in the hold mode.

This invention allows for the use of a low cost speed trigger mechanism using a movable core variable inductor instead of a potentiometer. A speed trigger mechanism could be low cost to make and install and may operate on four positions including off, decelerate, hold, and accelerate.

A speed hold feature may be added by having the microcontroller monitor a push button switch. When the button is pressed, the microcontroller will hold the current speed and ignore any signals from the speed control trigger. This allows the user to release the trigger and still maintain a constant motor speed. The user could either press the hold button a second time or press the speed control trigger to its maximum setting to restore control of the motor to the speed control trigger.

This control variability, which is directly related to the load on the motor, greatly improves low speed motor torque, as it reduces the unnecessary power sent to the motor when a light load is applied. Under the same concept, this invention also protects against excessive current due to a locked or too heavily loaded rotor.

The rotor position data that is obtained from the microcontroller can be used to extend brush life and improve motor efficiency. The data may be used to interrupt the current supplied to the motor immediately before the brushes pass over commutator gaps, thereby reducing sparking. This sparking is one of the main causes of brush deterioration. Many other motor control features are possible with appropriate microcontroller software within the skills of those of ordinary skill in the art.

Figure 2:
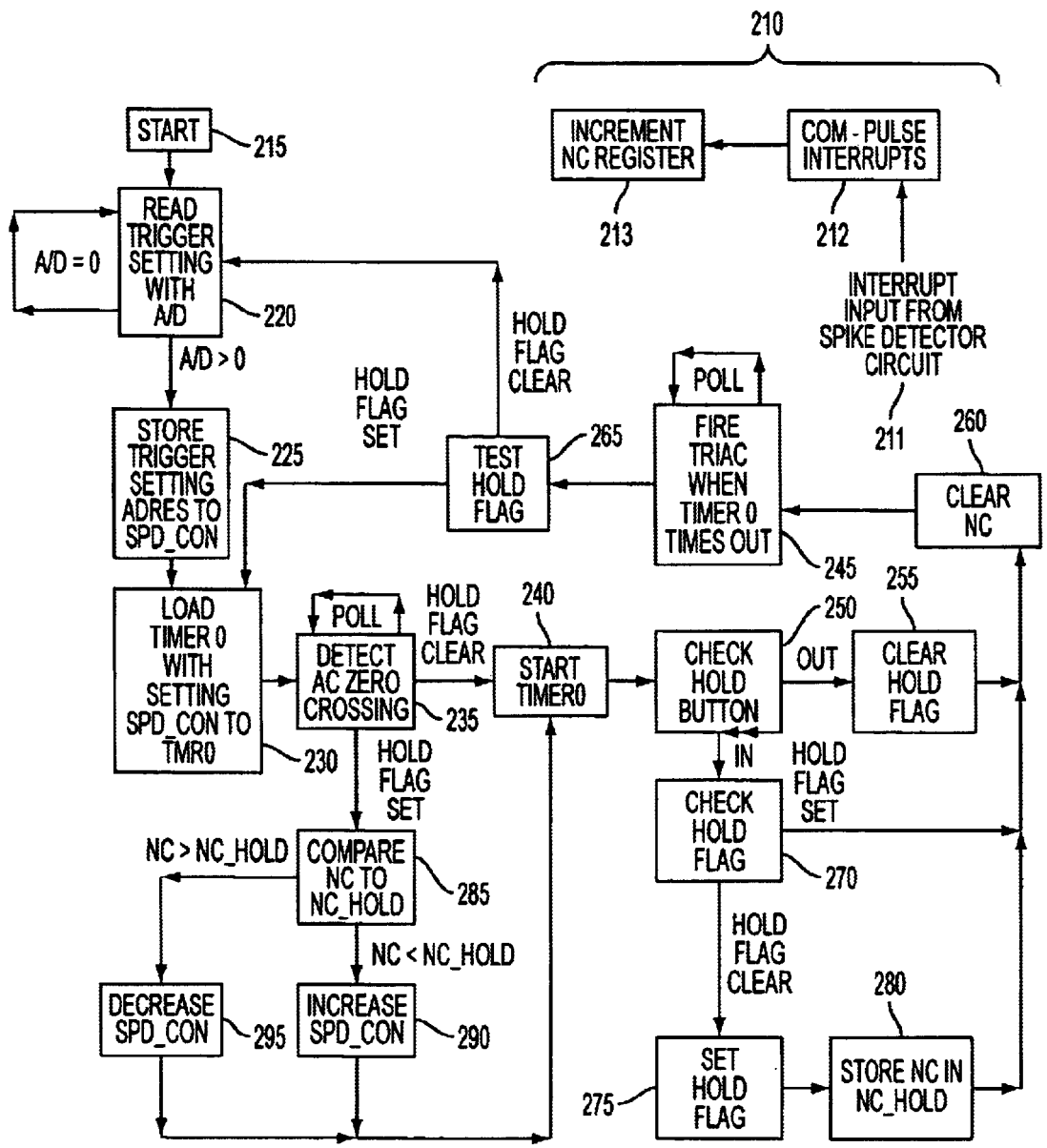
FIG. 2 illustrates a software flowchart of a microcontroller program to maintain constant motor speed as the load varies, according to an embodiment of the invention.

A flow chart of one embodiment of a computer program used to demonstrate this invention's ability to maintain constant motor speed as load varies is shown in FIG. 2. This program demonstrates a practical application of an embodiment of the invention. In addition to the rudimentary features demonstrated by this flow chart, additional features such as: active load compensation which maintains motor speed without a hold-speed button, multiple mode selection by the operator, elimination of the need for a trigger potentiometer, control of motor acceleration and deceleration rates and protection against motor over heating due to a stall condition, may be implemented as described herein.

The software program illustrated in FIG. 2 may be written and downloaded into a prototype motor control circuit where it is stored in the memory of a microcontroller integrated circuit. The microcontroller has a built in analog to digital converter (A/D), programmable timer (Timer 0), I/O ports and external INTERRUPT capability.

The inputs to the microcontroller are: an analog voltage from the speed trigger potentiometer (this is how the motor operator sets the desired motor speed), a digital input from the spike detector circuit (this is for determining the relative speed of the motor), a digital input from the AC zero crossing detector circuit (this is used to begin the time delay before firing the TRIAC for phase control), and a digital input from the hold-speed push button switch. A digital output from the microcontroller is used to drive the gate of the TRIAC, which applies power to the motor.

In the upper right corner of the software flow chart is a representation of the microcontroller INTERRUPT operation 210. A digital signal from the spike detector circuit 211 is fed to an external INTERRUPT input pin of the microcontroller 212. The INTERRUPT feature of the microcontroller 212 may always be enabled. Whenever a spike is detected, the microcontroller will pause from its present task and increment the spike total stored in the NC register 213. This technique enables the rapid counting of high frequency, short duration spikes, which are caused by the motor's brushes passing over gaps in the commutator.

When power is first applied to the microcontroller 215 (see START block on flow chart), all of the registers are reset and the INTERRUPT is enabled. The CPU (Central Processing Unit) of the microcontroller uses the A/D converter to read the voltage 220 coming from the speed trigger control potentiometer. If the voltage equals zero (A/D=0), the CPU keeps repeatedly sampling the voltage until the operator presses the trigger control. Once the trigger control is pressed (A/D>0), the CPU stores the trigger setting in the SPD_CON register 225. The SPD_CON value is then loaded into the TMR0 register of timer 0 230. This programs the delay time produced by timer 0, which will determine the duty cycle of the pulse width modulation (PWM) applied to the TRIAC. The PWM of the TRIAC will control the speed of the motor.

Next the CPU waits in a polling loop until it detects that the AC sinusoidal line voltage has crossed zero 235. Let's assume for now that the hold-speed push button switch has not been pressed and the Hold Flag bit is clear. In this case, the CPU starts timer 0 240 which begins ticking down microseconds until TRIAC firing time 245. The CPU then checks the hold-speed push button switch 250. Assuming it has not been pressed, the CPU then clears the Hold Flag bit 255. Then the NC register is cleared 260 to allow a new count of spike pulses to begin.

The CPU now polls the timer 0 flag, waiting for the time delay to expire. When the timer times out, the CPU sends a pulse to the gate of the TRIAC 245 which applies power to the motor. This time delay determines the amount of time during each half cycle of the 60 hertz AC line during which power is applied to the motor. Next the CPU checks the Hold Flag 265. If the Hold Flag is clear, the CPU will again read the trigger setting with the A/D converter 220. This begins the program loop over again. The loop is executed 120 times every second.

Now, for the case where the operator presses the hold-speed push button switch. (This program is written for use with a mechanically latching push button, but other similar programs may be written allowing for a momentary contact type of push button.)

When the CPU comes to the part of the program Check Hold Button, it will take the path to Check Hold Flag 270. Since this is the first time the CPU has encountered the hold button being pressed, it will set the hold flag 275. The CPU will now read the present frequency of the spikes which is contained in the NC register. This value is then stored in the NC_HOLD register 280. (This value will be used as a reference frequency, and the CPU will adjust power to the motor to maintain the frequency at this value.) The NC register is then cleared to allow a new count of spike pulses to begin 260.

The CPU now polls the timer 0 flag, waiting for the time delay to expire. When the timer times out, the CPU sends a pulse to the gate of the TRIAC 245 which applies power to the motor. This time delay determines the amount of time during each half cycle of the 60 hertz AC line during which power is applied to the motor. Next the CPU checks the Hold Flag 265. Since the Hold Flag is set, the CPU ignores the present trigger switch setting (the motor operator can release the trigger) and the SPD_CON value is then reloaded into the TMR0 register of timer 0 230.

Next the CPU waits in a polling loop until it detects that the AC sinusoidal line voltage has crossed zero 235. Since the Hold Flag is set, the CPU next compares the NC register (which contains present speed data) to the NC_HOLD register 285 (which contains desired speed data.) If the NC value is less than the NC_HOLD value, the CPU increases the value stored in the SPD_CON register 290, which will effectively increase the power supplied to the motor. If the NC value is greater than the NC_HOLD value, the CPU decreases the value stored in the SPD_CON register 295, which will effectively decrease the power supplied to the motor.

The CPU then starts timer 0 240 which begins ticking down microseconds until TRIAC firing time 245. The CPU then checks the hold-speed push button switch 250. Since the hold-speed push button is depressed, the CPU checks the Hold Flag and finds it set 270. Therefore, a new NC_HOLD value is not needed, so the NC register is cleared 260 to allow a new count of spike pulses to begin. This program looping mode will be continued until the hold-speed push button is released, at which time the CPU will return to reading the A/D value from the trigger switch.

Figure 3:
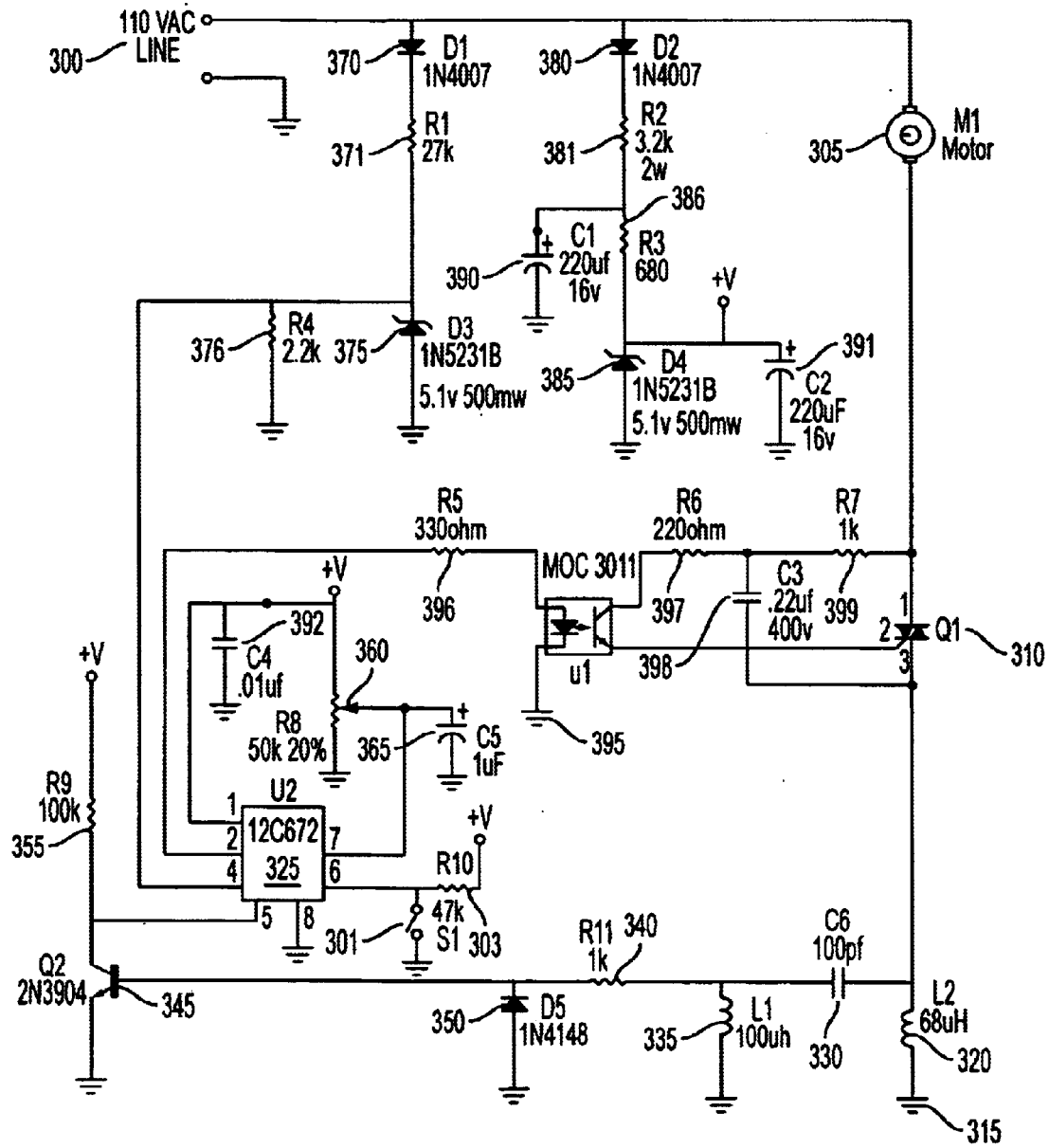
FIG. 3 illustrates an electric circuit embodiment of the invention.

A schematic of one embodiment of an electric circuit to maintain constant motor speed as load varies is shown in FIG. 3. Referring to the upper left region of the schematic, the 110 VAC line voltage 300 input to the circuit is seen. The high side of the 110VAC line 300 is connected to M1 305, the motor to be controlled. A TRIAC solid state switching device Q1 310 completes the circuit connection between the motor 305 and AC ground 315 through current sensing inductor L2 320. Q1 310 will be used by microcontroller U2 325 to control power supplied to the motor 305. The current interruptions due to the motor's brushes passing over commutator gaps will produce voltage spikes across inductor L2 320. Capacitor C6 330 and inductor L1 335 form a high pass filter which filters out the 60 Hertz component and permit the high frequency spikes to pass along to resistor R11 340. Resistor R11 340 limits the current to a safe value and couples the spikes to the base of transistor Q2 345. Diode D5 350 protects the base of Q2 345 from reverse voltage break down due to transients. Transistor Q2 345 amplifies the spikes and feeds them to the input port, pin 5, of microcontroller U2 325. Resistor R9 355 is part of Q2's 345 amplifier circuit.

Potentiometer R8 360 is the speed control trigger and its voltage setting is fed into pin 7 of the microcontroller 325 which connects to the analog to digital converter. Capacitor C5 365 filters noise from this signal. Diodes D1 370 and D3 375 along with resistors R1 371 and R4 376 rectify and reduce the AC line voltage 300 before feeding it into the input port, pin 4, of microcontroller U2 325 to perform zero-crossing detection. Diodes D2 380 and D4 385 along with resistors R2 381 and R3 386 rectify and reduce the AC line voltage 300 to provide a 5 volt DC power supply for U2 325 and Q2 345. Capacitors C1 390, C2 391, and C4 392 are filter capacitors for this DC power supply.

The microcontroller U2 325 controls power to the motor by outputting a pulse on pin 4 which is fed to optocoupler U1 395 through resistor R5 396. The optocoupler 395 isolates U2 325 from the AC line voltage 300 at the TRIAC 310 while assuring adequate drive voltage to the TRIAC's gate. Resistor R6 397 limits TRIAC gate current. Capacitor C3 398 and resistor R7 399 form a snubber network to filter voltage transients and assure proper TRIAC turn-off when controlling an inductive motor load. Switch S1 301 is the hold-speed push button switch used to signal the microcontroller 325 through the input port at pin 6. Resistor RIO 303 is a pull-up resistor.

Aspects of this invention can be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same or similar to those used in the invention.

The terms a or an, as used herein, are defined as one or more than one. The terms including and/or having, as used herein, are defined as comprising (i.e., open language). The term coupled, as used herein, is defined as connected, although not necessarily directly, and not necessarily mechanically. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Practical Applications of the Invention

A practical application of the invention that has value within the technological arts is in household appliances such as food processors or variable speed power tools such as a drill, saw, sander or buffer, where the speed and load on the motor can vary during operation. Further, the invention is useful in conjunction with motorized industrial equipment in the field of construction or motorized vehicles. There are virtually innumerable uses for the invention, all of which need not be detailed here, but will be readily recognized by those having ordinary skill in the art.

Advantages of the Invention

An advantage of the invention is that it improves the performance of a motor by maintaining a constant RPM (Rotations per Minute) under varying load conditions. It can also extend the brush life of all universal, AC and DC, and commutator type DC motors while remaining inexpensive to manufacture and install. Additionally, it does not require costly modification to the motor.

Another advantage of the invention is that it can directly replace existing speed control modules in products already out on the market as well as be easily installed in new products. It can also be used as an external and independent module that existing products can be easily connected to.

All the disclosed embodiments of the invention disclosed herein can be made and used without undue experimentation in light of the disclosure. It will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein.

Further, although the speed control device described herein can be a separate module, it will be manifest that this motor speed control device may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method comprising:
   sending power to an electric motor that employs a commutator and brushes;
   reading a set of data from the electric motor using an analog to digital converter and a microcontroller configured to execute digital signal processing software;
   setting a speed for the electric motor; and
   maintaining the speed for the electric motor based on the set of data as analyzed by the microcontroller.

2. The method of claim 1, wherein sending power to the electric motor includes sending a current through a current sensing device.

3. The method of claim 2, wherein sending the current through the current sensing device is followed by sending the current through a solid state switch.

4. The method of claim 1, wherein sending power to the electric motor includes sending an output current from a solid state switch to the electric motor.

5. The method of claim 1, wherein reading the set of data from the electric motor includes passing a voltage of the current sensing device through a high pass filter.

6. The method of claim 5, wherein the high pass filter removes a 60 Hz frequency component.

7. The method of claim 5, wherein the high pass filter enhances high frequency voltage spikes.

8. The method of claim 5, wherein passing the voltage of the current sensing device through the high pass filter is followed by sending the voltage to the analog to digital converter.

9. The method of claim 5, wherein passing the voltage of the current sensing device through the high pass filter is followed by sending the voltage through an amplifier with the amplifier's output voltage sent to a digital I/O port of the microcontroller.

10. The method of claim 5, wherein passing the voltage of the current sensing device through the high pass filter is followed by sending the voltage through an amplifier whose gain is controlled by the microcontroller, with the amplifier's output voltage sent to a digital I/O port of the microcontroller.

11. The method of claim 1, wherein reading the set of data from the electric motor includes passing a current from a power source through an attenuator.

12. The method of claim 11, wherein passing the current from the power source through an attenuator is followed by sending the current to the analog to digital converter and/or digital I/O port.

13. The method of claim 1, wherein setting the speed for the electric motor includes sending an output voltage from a speed control trigger to the analog to digital converter.

14. The method of claim 1, wherein setting the speed for the electric motor includes sending voltage from switches to digital I/O ports of the microcontroller to activate modes such as: accelerate, hold speed or decelerate.

15. The method of claim 1, wherein setting the speed for the electric motor includes sending an output of the analog to digital converter to the microcontroller.

16. The method of claim 1, wherein maintaining the speed for the electric motor includes sending an output of the microcontroller to a solid state switch.

17. The method of claim 16, wherein maintaining the speed for the electric motor includes sending an output current of the solid state switch to the electric motor.

18. A method for controlling performance of an electric motor, comprising:
   separating a plurality of commutator spikes from noise present in a current waveform;
   measuring a frequency or a time between the plurality of commutator spikes to determine a speed of the electric motor;
   varying a duty cycle of a voltage applied to the electric motor to control its speed; and
   maintaining constant motor speed as a load upon the electric motor varies.

19. The method of claim 18, further comprising:
   sensing a time of spike occurrence and predicting an occurrence time of a next spike;
   momentarily interrupting a current to the electric motor to eliminate or reduce spikes, thereby reducing arcing between a commutator and a plurality of brushes; and
   creating a pulse width modulation output waveform of varying frequency and duty cycle whose off time is synchronized with a predicted occurrence time of the next spike, thereby reducing arcing between the commutator and the plurality of brushes.

20. The method of claim 19, further comprising:
   sensing a motor-stalled condition and reducing a current of the electric motor to a value to prevent motor damage; and
   gradually increasing the current of the electric motor until motion is sensed by detection of a commutator spike, after which current is reduced to zero and then gradually increased again to produce a very low speed or stepper-motor operation.

21. An apparatus, comprising:
   a current sensing device, coupled in series to an electric motor, configured to monitor a current of the electric motor;
   a solid state switch, coupled to the current sensing device, configured to control an amount of current delivered to the electric motor;
   a high pass filter, coupled to the current sensing device, configured to remove a 60 Hz frequency component from a voltage of the current sensing device;
   a microcontroller, coupled to the solid state switch, configured to perform digital signal processing; and
   an analog to digital converter configured to send digital output to the microcontroller.

22. The apparatus of claim 21, wherein the microcontroller is configured to:
separate a plurality of commutator spikes from noise present in a current waveform;
measure a frequency or a time between the plurality of commutator spikes to determine a speed of the electric motor;
vary a duty cycle of a voltage applied to the electric motor to control its speed; and
maintain constant motor speed as a load upon the electric motor varies.

23. The apparatus of claim 21, wherein the microcontroller is configured to:
sense a time of spike occurrence and predict an occurrence time of a next spike;
momentarily interrupt a current to the electric motor to eliminate or reduce spikes, thereby reducing arcing between a commutator and a plurality of brushes; and
create a pulse width modulation output waveform of varying frequency and duty cycle whose off time is synchronized with a predicted occurrence time of the next spike, thereby reducing arcing between the commutator and the plurality of brushes.

24. The apparatus of claim 21, wherein the microcontroller is configured to:
sense a motor-stalled condition and reduce a current of the electric motor to a value to prevent motor damage; and
gradually increase the current of the electric motor until motion is sensed by detection of a commutator spike, after which current is reduced to zero and then gradually increased again to produce a very low speed or stepper-motor operation.

25. The apparatus of claim 21, wherein an input power source is coupled to the current sensing device.

26. The apparatus of claim 21, wherein the analog to digital converter is coupled to the microcontroller coupled to the solid state switch.

27. The apparatus of claim 21, further comprising an attenuator coupled to the analog to digital converter.

28. The apparatus of claim 27, wherein the attenuator is coupled to an input power source.

29. The apparatus of claim 21, further comprising a speed control trigger coupled to the analog to digital converter.

30. The apparatus of claim 21, wherein the solid state switch is coupled to the electric motor.

* * * * *